_(12)_ United States Patent
Manek et al.

(10) Patent No.: US 7,431,845 B2
(45) Date of Patent: Oct. 7, 2008

(54) METHOD OF CLARIFYING OILY WASTE WATER

(75) Inventors: Maria B. Manek, Stafford, TX (US); Michael J. Howdeshell, Sugar Land, TX (US); Kirk E. Wells, Sugar Land, TX (US); Hester A. Clever, Houston, TX (US); William K. Stephenson, Sugar Land, TX (US)

(73) Assignee: Nalco Company, Naperville, IL (US)

( * ) Notice: Subject to any disclaimer, the term of this patent is extended or adjusted under 35 U.S.C. 154(b) by 392 days.

(21) Appl. No.: 11/159,498

(22) Filed: Jun. 23, 2005

(65) Prior Publication Data

US 2006/0289359 A1    Dec. 28, 2006

(51) Int. Cl.
*C02F 1/56* (2006.01)
*B01D 17/05* (2006.01)
(52) U.S. Cl. .................. 210/708; 210/734; 210/735; 210/736; 516/148; 516/161; 516/179
(58) Field of Classification Search ............. 210/708
See application file for complete search history.

(56) References Cited

U.S. PATENT DOCUMENTS

| 3,703,545 | A | * | 11/1972 | McCrary | 562/102 |
| 4,308,149 | A | * | 12/1981 | Selvarajan | 210/736 |
| 4,457,860 | A | * | 7/1984 | Conklin et al. | 516/162 |
| 4,737,550 | A | * | 4/1988 | Tomalia | 525/418 |
| 4,935,162 | A | * | 6/1990 | Barthold et al. | 208/188 |
| 5,045,212 | A | * | 9/1991 | Augustin et al. | 210/708 |
| 5,445,765 | A | | 8/1995 | Elfers et al. | 252/344 |
| 5,759,409 | A | * | 6/1998 | Knauf et al. | 210/708 |
| 5,846,453 | A | * | 12/1998 | Mohr et al. | 516/171 |
| 5,977,293 | A | | 11/1999 | Steuerle et al. | 528/424 |

\* cited by examiner

*Primary Examiner*—Peter A. Hruskoci
(74) *Attorney, Agent, or Firm*—Michael B. Martin

(57) ABSTRACT

A method of clarifying oily waste water comprising adding to the waste water an effective clarifying amount of one or more demulsifiers selected from the group consisting of dendritic polyamines, dendritic polyamidoamines and hyperbranched polyethyleneimines and the reaction products thereof with gluconolactone, alkylene oxides, salts of 3-chloro-2-hydroxypropanesulfonic acid, alkyl halides, benzyl halides and dialkyl sulfates.

17 Claims, No Drawings

METHOD OF CLARIFYING OILY WASTE WATER

TECHNICAL FIELD

This invention is a method of clarifying oily wastewater using dendritic polyamines, dendritic polyamidoamines or hyperbranched polyethyleneimines or functionalized derivatives thereof.

BACKGROUND OF THE INVENTION

Oily wastewaters containing emulsified hydrocarbons are produced in various industries including the steel and aluminum industries, chemical processing industry, automotive industry, laundry industry and crude oil recovery and refining industries. Typical emulsified hydrocarbons include lubricants, cutting fluids, tars, grease, crude oils, diesel oils, gasoline, kerosene, jet fuel, and the like.

The emulsified hydrocarbon in the water is typically present in the range of tens to thousands of ppm. This residual hydrocarbon must be removed prior to discharge of the water to the environment or reuse of the water in the industrial process. In addition to ecological concerns and governmental regulations, efficient removal of emulsified hydrocarbons is also vital for economic reasons as use of water containing emulsified oil in industrial processes eventually results in decreased production and increased operational costs for the industry involved.

One of the most effective methods of removing the emulsified oil is through the use of water clarifiers. Historically, dry polymers, solution polymers, water-soluble dispersion polymers, inverse emulsion latexes and metal ions have been used to treat the produced water. Each material has its own advantages and disadvantages. Dry polymers have the benefit of reduced shipment cost (less volume due to the lack of the solvent) but for the same reason they require special equipment in order to dissolve them prior to use in the field.

Latex polymer's performance is quite superior and they are used frequently; however, they have their own set of problems. They have a narrow treating range often resulting in over-treatment, and they have to be inverted prior to use. Therefore, like dry polymers they require special equipment in the oil field. This equipment is very often unavailable, and the use of uninverted products may cause a lot of plugging problems in the feeding system.

Solution polymers are often very diluted due to their limited solubility. They are also usually unable to flocculate the dispersed oil, thus requiring another chemical (either latex or dispersion polymer) to accomplish this. Thus, they are used to break reverse emulsions in the field, while the second, "finishing product", is added in the final stages of water clarification.

Metal ions, such as $Fe^{3+}$, $Zn^{2+}$, $Al^{3+}$, etc. have been used to break reverse emulsion for a long time, but recent government regulations have restricted their levels in discharged streams. Although effective at breaking reverse emulsions, they also require another chemical to flocculate the oil.

Dispersion polymers offer solutions to some of these problems, but they are not totally problem-free either. Though water soluble, their very high molecular weight and associated with this viscosity changes upon dilution require very sophisticated feeding system, which often hinders their application in the field.

Some of the best from above listed water clarifiers have also been used to remove residual oil from the quench water in dilution steam systems of petrochemical industry. In the ethylene manufacturing plant, water is used in the quench column (tower) to cool the gas leaving the primary distillation tower (primary fractionator). In the base of such a tower, hot quench water is separated from condensed hydrocarbons and sent back to a dilution steam generator, while the oil is returned to the system as a reflux. When the oil and water are emulsified, the separation of the two phases is often aided by the use of chemical additives, otherwise the residual oil can foul the dilution steam system and cause a additional fouling problems downstream. The separation of the two phases should occur rapidly due to short system retention times; therefore, it is imperative that the products possess superior performance.

Accordingly, there is an ongoing need for efficient, economical and environmentally friendly methods of clarifying oily wastewater.

SUMMARY OF THE INVENTION

This invention is a method of clarifying oily waste water comprising adding to the waste water an effective clarifying amount of one or more demulsifiers selected from the group consisting of dendritic polyamines, dendritic polyamidoamines and hyperbranched polyethyleneimines and the reaction products thereof with gluconolactone, alkylene oxides, salts of 3-chloro-2-hydroxypropanesulfonic acid, alkyl halides, benzyl halides and dialkyl sulfates.

DETAILED DESCRIPTION OF THE INVENTION

Suitable demulsifiers for use in the method of this invention include water- and oil-soluble dendritic polyamines, dendritic polyamidoamines and hyperbranched polyethyleneimines and derivatives thereof formed by reacting the dendritic polyamines, dendritic polyamidoamines and hyperbranched polyethyleneimines with gluconolactone, alkylene oxides, salts of 3-chloro-2-hydroxypropanesulfonic acid, alkyl halides, benzyl halides or dialkyl sulfates.

In an embodiment, the polyalkyleneimine has a molecular weight of about 300 to about 5,000,000 Daltons.

In an embodiment, the polyalkyleneimine is a dendritic polyamine of formula

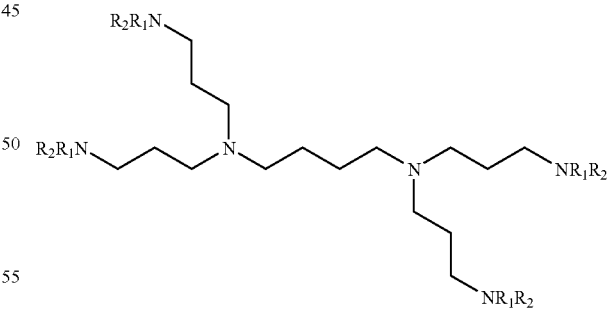

wherein $R_1$ and $R_2$ are independently selected at each occurrence from H and —$(CH_2CH_2NH)_m$—H wherein m is 1 to about 4.

Dendritic polyamines are typically prepared by reaction of diaminobutane with acrylonitrile followed by hydrogenation. Dendritic polyamines are commercially available from various sources including Aldrich, Milwaukee, Wis. under the trade name DAB-AM and DSM, Geleen, The Netherlands, under the trade name Astramol.

In an embodiment, the dendritic polyamine has a molecular weight of about 300 to about 4,000 Daltons.

Representative dendritic polyamines according to this embodiment include DAB-Am-4 ($R_1$, $R_2$=H, MW 316), DAB-Am-8 ($R_1$, $R_2$=—$CH_2CH_2CH_2NH_2$, MW 773), DAB-Am-16 ($R_1$, $R_2$=—($CH_2CH_2CH_2NH)_2H$, MW 1687) and DAB-Am-32 ($R_1$, $R_2$=—($CH_2CH_2CH_2NH)_4H$, MW 3510).

In an embodiment, the polyalkyleneimine is a dendritic polyamidoamine of formula

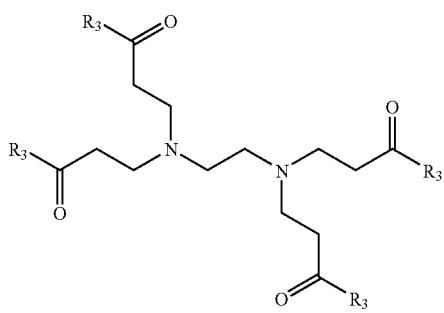

wherein $R_3$ is independently selected at each occurrence from OH and a group of formula —$NCH_2CH_2N(R_4)_2$ wherein $R_4$ is independently selected at each occurrence from H and a group of formula —$CH_2CH_2CO_2R_6$ wherein $R_6$ is H or a group of formula —$NCH_2CH_2N(R_7)_2$ wherein $R_7$ is independently selected at each occurrence from H and a group of formula —$CH_2CH_2CO_2R_8$ wherein $R_8$ is independently selected at each occurrence from H and a group of formula —$NCH_2CH_2NH_2$.

Dendritic polyamidoamines may be prepared by Michael addition of ethylenediamine to methyl acrylate followed by the amidation of the initial tetraester with ethylenediamine. The sequence of reaction with methyl acrylate and then ethylenediamine is repeated until the desired molecular weight is obtained. Dendritic polyamidoamines are also commercially available, for example from Dendritech, Midland, Mich. under the trade name Starburst.

In an embodiment, the dendritic polyamidoamine has a molecular weight of about 296 to about 4,000.

Representative dendritic polyamidoamines according to this embodiment include Starburst Gen. –0.5 ($R_3$=OH, MW 296), Starburst Gen. 0 ($R_3$=$NHCH_2CH_2NH_2$, MW 517), Starburst Gen 0.5 ($R_3$=$NHCH_2CH_2N(R_4)_2$, $R_4$=$CH_2CH_2CO_2H$), Starburst Gen. 1 ($R_3$=$NHCH_2CH_2N(R_4)_2$, $R_4$=$CH_2CH_2COR_6$, $R_6$=$NHCH_2CH_2NH_2$, MW 1430), Starburst Gen. 1.5 ($R_3$=$NHCH_2CH_2N(R_4)_2$, $R_4$=$CH_2CH_2CO_2R_6$, $R_6$=$NHCH_2CH_2(R_7)_2$, $R_7$=$CH_2CH_2CO_2H$), Starburst Gen. 2 ($R_3$=$NHCH_2CH_2N(R_4)_2$, $R_4$=$CH_2CH_2COR_6$, $R_6$=$NHCH_2CH_2N(R_7)_2$, $R_7$=$CH_2CH_2COR_8$, $R_8$=$NHCH_2CH_2NH_2$, MW 3256).

In an embodiment, the polyalkyleneilnifle is a hyperbranched polyethyleneimine of formula

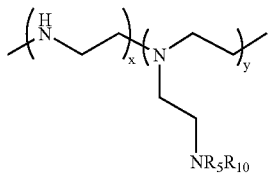

wherein $R_5$ and $R_{10}$ are independently selected at each occurrence from H and —$(HNCH_2CH_2NH)_r$—H wherein r is 1 to about 200.

In an embodiment, the hyperbranched polyethyleneimine has a molecular weight of about 800 to about 2,000,000 Daltons.

Suitable hyperbranched polyethyleneimines may be prepared by catalytic ring opening polymerization of ethyleneimine (aziridine) as described in WO 97/21760. Hyperbranched polyethyleneimines are also commercially available from BASF, Milwaukee, Wis., under the trade name Lupasol, from Aldrich, Milwaukee, Wis. and from Summit Specialty, Ft. Lee, N.J., under the trade name Epomin.

Representative hyperbranched polyethyleneimines include Lupasol FG (MW 800), Lupasol G20 (MW 1300), Lupasol PR8515 (MW 2,000), Lupasol G35 (MW 2,000), Lupasol PS (MW 750,000), Lupasol P (MW 750,000), Lupasol SK (MW 2,000,000), Lupasol SU 312, PEI 600 (Aldrich, MW 600) and Epomin 006 (MW 600).

In an embodiment, the dendritic polyamine, dendritic polyamidoamine or hyperbranched polyethyleneimine is functionalized by reaction with one or more alkylating agents selected from alkyl halides, benzyl halides and dialkyl sulfates. As used herein, "alkyl" means a straight or branched aliphatic hydrocarbon having one to about 4 carbon atoms. "Benzyl" means a group of formula $C_6H_4CH_2$— in which one or more of the aromatic hydrogen atoms are optionally replaced with an alkyl, alkoxy, halogen or haloalkyl group. Dialkyl sulfate means a group of formula $(R'O)_2SO_2$ wherein R' is alkyl. "Halogen", "halide" and "halo" mean Br, Cl, F or I.

In an embodiment, the alkyl halides, benzyl halides and dialkyl sulfates are selected from the group consisting of methyl halide, benzyl halide and dimethyl sulfate.

In a typical alkylation procedure, a 50 percent aqueous solution of the dendritic polyamine, dendritic polyamidoamine or hyperbranched polyethyleneimine is heated with a slight excess of alkylating agent at reflux for about 2 hours. The mixture is then cooled to ambient temperature and diluted with water to the desired concentration, generally about 50 percent polymer actives. Representative alkylated derivatives, also commonly referred to as "quaternized" derivatives or "quats" are shown in Table 1.

TABLE 1

Representative Alkylated Demulsifiers

| Substrate (Mol. W) | Alkylating agent | Mol. charge (%) |
| --- | --- | --- |
| Lupasol PR8515 (2000) | Benzyl chloride | 36.70 |
| Lupasol FG (800) | Benzyl chloride | 50.00 |
| Lupasol PR-8515 | Benzyl chloride | 18.00 |
| Lupasol G20 (1300) | Benzyl chloride | 26.00 |
| Lupasol G20 (1300) | Dimethyl sulfate | 18.00 |
| Lupasol G20 (1300) | Dimethyl sulfate | 9.00 |
| Lupasol G20 (1300) | Benzyl chloride | 18.00 |
| Lupasol G20 (1300) | Benzyl chloride | 26.00 |
| Lupasol PR8515 (2000) | Benzyl chloride | 9.00 |
| Lupasol PR8515 (2000) | Benzyl chloride | 26.00 |
| Lupasol SC-61B (NA) | Benzyl chloride | low |
| Lupasol SC-61B (NA) | Benzyl chloride | high |
| Epomin 006 (600) | Benzyl chloride | 4.60 |
| Epomin 006 (600) | Benzyl chloride | 9.20 |
| Lupasol FG (800) | Benzyl chloride | 11.60 |
| Lupasol FG (800) | Benzyl chloride | 23.20 |
| Lupasol FG (800) | Methyl iodide | 4.60 |
| Lupasol FG (800) | Methyl iodide | 9.20 |
| Epomin 006 (600) | Methyl iodide | 4.60 |
| Epomin 006 (600) | Methyl iodide | 9.20 |
| Epomin 006 (600) | Methyl iodide | 13.80 |

TABLE 1-continued

Representative Alkylated Demulsifiers

| Substrate (Mol. W) | Alkylating agent | Mol. charge (%) |
|---|---|---|
| Epomin 006 (600) | Benzyl chloride | 13.80 |
| Epomin 006 (600) | Benzyl chloride | 18.40 |
| Lupasol G20 (1300) | Benzyl chloride | 4.60 |
| Lupasol P (750 000) | Methyl iodide | 4.60 |
| Lupasol SC-61B | Methyl iodide | low |
| Lupasol SK (2 000 000) | Methyl iodide | low |
| Lupasol PR8515 (2000) | Methyl iodide | 4.60 |
| Lupasol FG (800) | Methyl iodide | 13.80 |
| Lupasol PR8515 (2000) | Methyl iodide | 9.0 |
| Lupasol G20 (1300) | Methyl iodide | 4.6 |

In an embodiment, the dendritic polyamine, dendritic polyamidoamine or hyperbranched polyethyleneimine is functionalized by reaction with gluconolactone.

In an embodiment, the dendritic polyamine, dendritic polyamidoamine or hyperbranched polyethyleneimine has a molecular weight of about 300 to about 7,000 Daltons.

In a typical procedure, the dendritic polyamine, dendritic polyamidoamine or hyperbranched polyethyleneimine is dissolved in DMSO and about a 10-fold excess of gluconolactone is added slowly with stirring under an argon purge. The mixture is then gently warmed to about 40° C. and left overnight under an argon atmosphere. The mixture is then poured into isopropanol to form a semi-liquid residual that settles on the bottom of the flask. The material is washed repeatedly with methanol to yield the gluconolactone-capped derivative as a thick and viscous gold taffy-like material. Representative gluconolactone-capped derivatives are shown in Table 2.

TABLE 2

Representative Gluconolactone-Capped Demulsifiers

| Substrate (source) | M.W. of a substrate |
|---|---|
| DAB-Am4 (Aldrich) | 316 |
| DAB-Am8 (Aldrich) | 773 |
| Starbust Gen. 2.0 (Dendritech) | 6909 |
| DAB-Am16 (Aldrich) | 1687 |
| Lupasol G20 (BASF) | 1300 |
| PEI 800 (Aldrich) | 800 |
| Pentaethylenehexamine (Aldrich) | 232 |
| Pentaethylenehexamine (Aldrich) | 189 |

In an embodiment, the dendritic polyamine, dendritic polyamidoamine or hyperbranched polyethyleneimine is functionalized by reaction with 3-chloro-2-hydroxypropanesulfonic acid or a salt thereof.

In a typical procedure, polyalkyleneimine and about 70 to about 300 percent by mass relative to polyalkyleneimine of 1-chloro-2-hydroxy-3-sulfonic acid sodium salt are dissolved in water at about 20 to 40 percent actives. The mixture is stirred by mechanical shaker or overhead stirrer until the reaction pH stabilizes, which generally requires about 72 hours at ambient temperature or about 4 hours at reflux. The pH typically drops from 2 to 3 units depending on the amount of alkylation achieved. Although alkylation of the primary amines is believed to predominate lesser amounts of alkylation of the secondary and tertiary amines are also possible.

In an embodiment, the polyalkyleneimine is a hyperbranched polyethyleneimine.

In an embodiment, the dendritic polyamine, dendritic polyamidoamine or hyperbranched polyethyleneimine is functionalized by reaction with one or more alkylene oxides to form the hydroxyalkylated derivative.

The hydroxyalkylated derivative may be prepared by heating an aqueous solution of dendritic polyamine, dendritic polyamidoamine or hyperbranched polyethyleneimine with the desired amount of alkylene oxide at a temperature of about 80° C. to about 135° C., optionally in the presence of an alkali metal catalyst such as sodium methoxide, potassium tert-butoxide, potassium or sodium hydroxide, and the like.

The reaction may be conducted in a pressure vessel or with continuous removal of water. Alternatively, the reaction may be conducted in multiple stages where a portion of the alkylene oxide is added and allowed to react, followed by a second portion of alkylene oxide and additional base as necessary. If desired, water may be removed from the reaction mixture by distillation between the stages. Procedures for the hydroxyalkylation of polyalkyleneimines are described in detail in U.S. Pat. No. 5,445,767 and WO 97/27879, incorporated herein by reference.

Alkylene oxides useful for preparing the hydroxyalkylated polyethyleneimines of this invention have formula

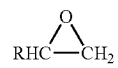

where R is H or $C_1$-$C_4$ alkyl. Representative alkyleneoxides include ethylene oxide, propylene oxide, butylene5 oxide, and the like.

In an embodiment, the alkylene oxides are selected from ethylene oxide and propylene oxide.

In an embodiment, a hyperbranched polyethyleneimine is functionalized by reaction with ethylene oxide and optionally propylene oxide.

In an embodiment, the hyperbranched polyethyleneimine is functionalized by reaction with about 1 to about 85 molar equivalents of ethylene oxide per ethylene unit in the polyethyleneimine.

In an embodiment, the hyperbranched polyethyleneimine is functionalized by reaction with about 5 to about 85 molar equivalents of ethylene oxide and about 5 to about 85 molar equivalents of propylene oxide per ethylene unit in the polyethyleneimine.

In an embodiment, the hyperbranched polyethyleneimine is reacted first with the propylene oxide and subsequently with the ethylene oxide.

In an embodiment, the hyperbranched polyethylene is functionalized by reaction with about 5 to about 25 molar equivalents of ethylene oxide and about 85 to about 98 molar equivalents of propylene oxide per ethylene unit in the polyethyleneimine.

Representative hydroxyalkylated hyperbranched polyethyleneimines according to this invention are shown in Table 3.

TABLE 3

Representative Oxyalkylated Polyethyleneimines

| Substrate | PO % | EO % |
|---|---|---|
| Lupasol FG | 85.00 | 5.00 |
| Lupasol FG | 85.00 | 10.00 |
| Lupasol FG | 85.00 | 15.00 |
| Lupasol FG | 85.00 | 20.00 |
| Lupasol FG | 85.00 | 25.00 |
| Lupasol FG | 96.00 | 5.00 |
| Lupasol FG | 96.00 | 10.00 |

TABLE 3-continued

Representative Oxyalkylated Polyethyleneimines

| Substrate | PO % | EO % |
|---|---|---|
| Lupasol FG | 96.00 | 15.00 |
| Lupasol FG | 96.00 | 20.00 |
| Lupasol FG | 96.00 | 25.00 |

Suitable commercial oxyalkylated polyethyleneimines include Lupasol SC-61B, available from BASF and Kemelix 3550 X, 3423 X, 3546 X, D600 and 3582X available from Uniquema, New Castle, Del.

In an embodiment, the demulsifier of this invention is used for clarifying oil field produced water.

During oil production and processing, most of the crude oil is in the form of water in oil emulsions, the ratio of which is dependent on the natural conditions and the history of the reservoir. As the reservoir ages and becomes depleted, the amount of water produced along with oil increases, thus reducing operation efficiency and profitability. Often at a certain point of reservoir production, oilfield operators sustain depleting oil production by injecting water or steam into the formation.

This method is very widely used and referred to as secondary oil recovery. In both, primary and secondary oil recovery, the produced fluids consist of emulsified water and oil. To recover the oil, efficient separation processes and chemicals are used. However, some oil remains emulsified in the produced water. This remaining oil must be removed before the water is injected back to the reservoir, discharged into environment, or directed to steam generators.

In order to clarify the produced water, a demulsifier according to this invention is typically added to the produced water as an aqueous solution having a concentration of about 5 to about 90 weight percent. Alcohols such as methanol and/or glycols may also be added to the composition to improve its handling characteristics at low temperatures.

Typical dosage ranges for clarifying produced water are about 0.5 to about 20 ppm of demulsifier, although a dosage as high as about 100 ppm may be required in certain applications. The demulsifier of this invention does not over-treat easily, like latexes or dispersion polymers, and because of its excellent solubility it does not precipitate out of the solutions like metal ion compositions.

The demulsifier helps the emulsified oil to separate from the water and float to the surface of the water as a floc. This floc is subsequently removed from the surface of the water by conventional means including skimming, decanting, filtering, and the like and the clean water can be reused or discharged into environment.

In another embodiment, the demulsifier of this invention is used for clarifying petrochemical industry wastewater.

For example, in the ethylene manufacturing plant, water is used in the quench column (tower) to cool the gas leaving primary distillation tower (primary fractionator). In the base of such a tower, hot quench water is separated from condensed hydrocarbons and sent back to a dilution steam generator, while the oil is returned to the system. When the oil and water are emulsified, the residual oil can foul the dilution steam system and cause fouling problems downstream. Furthermore, the phases must also be separated rapidly due to short system retention times. This separation occurs readily in the presence of the hydroxyalkylated polyethyleneimine of this invention.

The effective clarification dose depends on emulsion stability and varies for different facilities and petrochemical plant designs. In general, most petrochemical industry applications use about 1 to about 40 ppm of demulsifier. However, up to 200 ppm of product might be required in certain applications.

The foregoing may be better understood by reference to the following Examples, which are presented for purposes of illustration and are not intended to limit the scope of this invention.

EXAMPLE 1

Evaluation of Representative Demulsifiers in the Petrochemical Industry

The treating efficiency of representative demulsifiers according to this invention is evaluated on-site at several locations in the United States and Canada. In all tests, a process sample is collected and used within 30 minutes. Each process sample is divided into 50 mL aliquots and these aliquots are placed into six-ounce bottles. One six-ounce bottle is left untreated and the other bottles are dosed with the target dosage of the product being tested. Each test site compares representative demulsifiers of this invention with current emulsion breakers. The current emulsion breakers tested include, all available from Nalco Company, Naperville, Ill.:

a) Commercial I—solution polymers such as dimethylamine-epichlorohydrin (DMAEM)-ammonia terpolymer or DMAEM homopolymers;
b) Commercial II—dispersion polymers such as quaternary ammonium salts prepared by reaction of benzyl chloride with dimethylaminoethyl acrylates.
c) Commercial III—latex polymers—such as diallyldimethylammonium chloride/acrylamide latex polymers.

Immediately after dosing, bottles are capped, labeled and hand shaken 50 times in sets of six, and water clarity is evaluated 5 minutes after agitation. Water clarity in the bottles is determined using a Hach 2000 or Hach 2010 multimeter in the turbidity mode. All values are reported in NTU units. A lower turbidity indicates a better separation, hence better performance. The results are shown in Table 4.

TABLE 4

Dose Response of Representative Demulsifiers

| Product | Dosage (ppm) | | | | | |
|---|---|---|---|---|---|---|
| | 0 | 1 | 5 | 10 | 20 | 50 |
| Hyperbranched high molecular weight PEI | 2247 | 2354 | 606 | 996 | 980 | 988 |
| Oxyalkylated hyperbranched PEI | 2247 | 1896 | 664 | 1220 | 1107 | 1306 |
| Hyperbranched PEI | 2247 | 2373 | 834 | 866 | 683 | 619 |
| Gluconate derivative of hyperbranched PEI 1300 | 2247 | 2160 | 589 | 777 | 574 | 645 |
| Nalco commercial III | 2247 | 2163 | 360 | 630 | 808 | 816 |
| Nalco commercial II | 2247 | 2220 | 640 | 744 | 423 | 635 |

As shown in Table 4, representative demulsifiers of this invention exhibit similar performance to current commercial treatments. The demulsifiers have similar efficiency at the low and high dosage (low risk of over treatment) and good clarifying properties. When combined with ease of application, they present a clear advantage over currently available treatments.

The response as a function of time is also measured in order to demonstrate how rapidly the demulsifiers clarify the water. The results are shown in Table 5.

TABLE 5

Time Response for Representative Demulsifiers

| Product | Time (minutes) | | | | |
|---|---|---|---|---|---|
| | 0 | 5 | 10 | 15 | 30 |
| hyperbranched high molecular weight PEI | 2470 | 840 | 832 | 825 | 762 |
| Oxyalkylated hyperbranched PEI | 2470 | 988 | 975 | 948 | 895 |
| hyperbranched PEI | 2470 | 792 | 783 | 772 | 747 |
| Gluconate derivative of hyperbranched PEI 1300 | 2470 | 995 | 981 | 947 | 893 |
| Nalco commercial III | 2470 | 582 | 579 | 571 | 553 |
| Nalco commercial II | 2470 | 979 | 967 | 912 | 924 |
| Blank | 2470 | 2470 | 2440 | 2425 | 2345 |

Tables 4 and 5 show how closely demulsifiers of this invention follow the performance pattern of the two widely used commercial products. They show similar versatility and efficiency over a wide range of dosages and times. The chief advantage of the demulsifiers of this invention, however, arises from their compatibility with treated waters. Their substantial water miscibility makes them easy to apply and difficult to precipitate in treated streams.

EXAMPLE 2

Evaluation of Water Clarifiers in the Oilfield.

The efficiency of representative demulsifiers for clarifying oilfield-produced water is also evaluated on site at several locations in California and Wyoming. Two to five gallons of oil field produced water are collected and used within the next two to four hours depending on the emulsion stability. Six ounce clear glass bottles are filled with 100 mL of water and inverted several times to coat the bottles with the emulsified fluid. The treating chemicals are added to individual bottles as one percent aqueous solutions.

Immediately after dosing, bottles are capped, labeled and agitated. The samples are all agitated identically to simulate turbulence in the system. The samples are hand shaken in sets of six either 50 or 100 times depending on the emulsion stability, and water clarity is visually evaluated through several sets of agitations (usually 2 to 3).

One bottle is left untreated and the other bottles are dosed with the target dosage of the product being tested. Each bottle contains a unique chemical. Readings are recorded after each series of shakes until clear water is observed in some bottles, typically at least three series of shakes.

Water in the bottles is compared within the set and graded on a scale from 0 to 10, where 0 represents a fully opaque blank sample at the beginning of the test, while 10 is assigned to clear water through which one could read.

Representative demulsifiers of this invention are compared to the current commercial chemical used at the particular site and also to the series of chosen standards. The standards consist of commonly used water clarifiers representing major chemistries available. They included following products, all available from Nalco Company, Naperville, Ill.:
d) metal ions—Commercial IV;
e) solution polymer—Commercial V;
f) dispersion polymers—Commercial VI; and
g) latex polymers—Commercial VII.

The results are shown in Tables 6-9.

TABLE 6

Comparison of Representative Demulsifiers and Commercial Treatments at a Dosage of 20 ppm at a Wyoming Field Site

| No. | Chemical | 100 shakes | 100 shakes | 100 shakes | Sum |
|---|---|---|---|---|---|
| 1 | Commercial IV | 6 | 7 | 9 | 21 |
| 2 | Commercial V | 6 | 8 | 9 | 23 |
| 3 | Commercial VI | 8 | 9 | 10 | 28 |
| 5 | Commercial VII | 6 | 8 | 10 | 24 |
| 6 | High M.W. hyperbranched PEI | 7 | 8 | 8 | 23 |
| 7 | Oxylkylated hyperbranched PEI | 9 | 10 | 10 | 29 |
| 8 | Gluconate derivative of dendrimer | 8 | 9 | 10 | 27 |
| 9 | Quaternary salt of hyperbranched PEI | 9 | 10 | 10 | 29 |

TABLE 7

Dosage Response for Representative Demulsifiers and Commercial Treatments at a California Field Site

| No. | Chemical | Dosage | 100 shakes | 100 shakes | 100 shakes | Sum |
|---|---|---|---|---|---|---|
| 1 | Commercial VI | 40 | 2 | 8 | 10 | 20 |
| 2 | Commercial VI | 60 | 8 | 8 | 10 | 26 |
| 3 | Commercial VI | 80 | 6 | 7 | 10 | 23 |
| 4 | Commercial VI | 100 | 3 | 5 | 7 | 15 |
| 5 | Oxylkylated hyperbranched PEI | 40 | 6 | 7 | 7 | 20 |
| 6 | Oxylkylated hyperbranched PEI | 60 | 7 | 8 | 10 | 25 |
| 7 | Oxylkylated hyperbranched PEI | 80 | 8 | 9 | 10 | 27 |
| 8 | Oxylkylated hyperbranched PEI | 100 | 8 | 8 | 9 | 23 |

TABLE 8

Comparison of Representative Demulsifiers and Commercial Treatments at a Dosage of 140 ppm at a Canada Field Site

| No. | Chemical | 100 shakes | 100 shakes | 100 shakes | Sum |
|---|---|---|---|---|---|
| 1 | Commercial IV | 2 | 4 | 6 | 12 |
| 2 | Commercial V | 0 | 0 | 0 | 0 |
| 3 | Commercial VI | 1 | 1 | 5 | 7 |
| 5 | High M.W. hyperbranched PEI | 1 | 4 | 6 | 11 |
| 6 | Oxylkylated hyperbranched PEI | 2 | 5 | 6 | 13 |
| 7 | Gluconate derivative of dendrimer | 2 | 4 | 7 | 13 |
| 8 | Quaternary salt of hyperbranched PEI 1300 MW | 3 | 5 | 8 | 16 |
| 9 | Quaternary salt of hyperbranched PEI 800 MW | 2 | 5 | 6 | 13 |

TABLE 9

Dosage Response for Representative Demulsifiers and
Commercial Treatments at a California Field Site

| No. | Chemical | Dosage | 100 shakes | 100 shakes | 100 shakes | Sum |
|---|---|---|---|---|---|---|
| 1 | Commercial IV | 100 | 2 | 4 | 6 | 12 |
| 2 | Commercial IV | 140 | 2 | 4 | 7 | 13 |
| 3 | Commercial IV | 160 | 3 | 8 | 10 | 21 |
| 5 | Quatermary salt of hyperbranched PEI 1300 | 100 | 2 | 4 | 7 | 13 |
| 6 | Quatermary salt of hyperbranched PEI 1300 | 140 | 4 | 8 | 9 | 21 |
| 7 | Quatermary salt of hyperbranched PEI 1300 | 160 | 4 | 9 | 10 | 23 |

As shown in Tables 6-9, representative demulsifiers of this invention exhibit comparable or superior performance when compared to current treatments at lower dosages over wide treating ranges and low tendency to over treat.

Changes can be made in the composition, operation, and arrangement of the method of the invention described herein without departing from the concept and scope of the invention as defined in the claims.

The invention claimed is:

1. A method of clarifying oily waste water comprising (a) adding to the waste water an effective clarifying amount of one or more hyperbranched polvethyleneimines,
wherein the hyperbranched polyethyleneimines have a molecular weight of about 300 to about 5,000,000 Daltons, and wherein the hyperbranched polyethyleneimines are functionalized by reaction with one or more alkylene oxide; and (b) seperating the oil from the water.

2. The method of claim 1 wherein the hyperbranched polyethyleneimines have a molecular weight of about 800 to about 2,000,000 Daltons.

3. The method of claim 2 wherein the wastewater is quench water in dilution steam systems.

4. The method of claim 1 wherein the ailcylene oxides are selected from ethylene oxide and propylene oxide.

5. The method of claim 4 wherein the hvperbranched polvethylenes are reacted with ethylene oxide and optionally propylene oxide.

6. The method of claim 5 wherin the hyperbranched polvethyleneimines are reacted with about 1 to about 85 molar equivalents of ethylene oxide per ethylene unit in the polyethyleneimine.

7. The method of claim 5 wherein the hyperbranched polvethyleneirnines are reacted with about 5 to about 85 molar equivalents of ethylene oxide and about 5 to about 85 molar equivalents of propylene oxide per ethylene unit in the polyethyleneimine.

8. The method of claim 5 wherin the hyperbranched polyethyleneimines are reacted first with the propylene oxide and subsequently with the ethylene oxide.

9. The method of claim 5 wherin the hyperbranched polyethyleneimines are reacted with about 5 to about 25 molar equivalents of ethylene oxide and about 85 to about 98 molar equivalents of propylene oxide per ethylene unit in the polyethyleneimines.

10. The method of claim 1 wherein the oily waste water is oil field produced water.

11. The method of claim 1 wherein the oily waste water is petrochemical industry water.

12. A method of clarifying oily waste water comprising (a) adding to the waste water an effective clarifying amount of one or more demulsifiers selected from the group consisting of dendritic polyamines, dendritic polyamidoamines and hyperbranched polyetlivieneimines wherein the demulsifier has a molecular weight of about 300 to about 5,000,000 Daltons and wherein the dendritic polyamine, dendritic polyamidoamine or hyperbranched polyethyleneimine is functionalized by reaction with gluconolactone; and (b) separating the oil from the water.

13. The method of claim 12 wherein the oily waste water is oil field produced water.

14. The method of claim 12 wherein the oily waste water is petrochemical industry wastewater.

15. A method of clarifying oily waste water comprising (a) adding to the waste water an effective clarifying amount of one or more demulsifiers selected from the group consisting of dendritic polyamines, dendritic polyamidoamines and hvperbranched polvethyleneimines wherein the demulsifier has a molecular weight of about 300 to about 5,000,000 Daltons and wherein the dendritic polyamine, dendritic polyamidoamine or hyperbranched polyethyleneimine is functionalized by reaction with 3-chloro-2-hydroxypropanesulfonic acid or a salt thereof; and (b) senarating the oil from the water.

16. The method of claim 15 wherein the oily waste water is oil field produced water.

17. The method of claim 15 wherein the oily waste water is petrochemical industry wastewater.

* * * * *